United States Patent
Ikeguchi (10) Patent No.: US 12,397,437 B2
(45) Date of Patent: Aug. 26, 2025

(54) MARKER DETECTION APPARATUS AND ROBOT TEACHING SYSTEM

(71) Applicant: DAIHEN Corporation, Osaka (JP)

(72) Inventor: Makoto Ikeguchi, Osaka (JP)

(73) Assignee: DAIHEN Corporation, Osaka (JP)

( * ) Notice: Subject to any disclaimer, the term of this patent is extended or adjusted under 35 U.S.C. 154(b) by 444 days.

(21) Appl. No.: 17/897,455

(22) Filed: Aug. 29, 2022

(65) Prior Publication Data

US 2023/0147940 A1 May 11, 2023

(30) Foreign Application Priority Data

Nov. 5, 2021 (JP) ................. 2021-181167

(51) Int. Cl.
*B25J 9/16* (2006.01)
(52) U.S. Cl.
CPC ............. *B25J 9/1697* (2013.01); *B25J 9/163* (2013.01); *B25J 9/1653* (2013.01); *B25J 9/1664* (2013.01)
(58) Field of Classification Search
CPC ............ B25J 9/1653; B25J 9/1664; B25J 9/163–1692
See application file for complete search history.

(56) References Cited

U.S. PATENT DOCUMENTS

| | | | |
|---|---|---|---|
| 2016/0117824 A1* | 4/2016 | Amma | G06T 7/73 382/103 |
| 2021/0114231 A1 | 4/2021 | Katagiri et al. | |

FOREIGN PATENT DOCUMENTS

| | | |
|---|---|---|
| JP | 2019-063954 | 4/2019 |
| JP | 2021-062463 | 4/2021 |

OTHER PUBLICATIONS

N. Larkin, A. Short, Z. Pan and S. van Duin, "Automatic program generation for welding robots from CAD," 2016 IEEE International Conference on Advanced Intelligent Mechatronics (AIM), Banff, AB, Canada, 2016, pp. 560-565, doi: 10.1109/AIM.2016.7576827 (Year: 2016).*

(Continued)

*Primary Examiner* — Gregory A Morse
*Assistant Examiner* — Ty Mitchell Beatty
(74) *Attorney, Agent, or Firm* — Sterne, Kessler, Goldstein & Fox P.L.L.C.

(57) ABSTRACT

Provided is a marker detection apparatus able to detect the position of a marker with high accuracy and a robot teaching system using the same. A marker detection apparatus includes: an image generation unit that superimposes point group data, acquired by a 3D camera and photographed from a viewpoint same as a viewpoint of a 2D camera, on image data acquired by the 2D camera, thereby generating a combined image; a marker position calculation unit that detects a marker and calculates a position of the marker on a basis of the image data; a plane detection unit that detects a plane on a basis of the point group data; a marker plane determination unit that determines a marker plane on a basis of point group data included in a region of the marker detected from the position of the marker calculated by the marker position calculation unit and the plane detected by the plane detection unit; and a marker position correction unit that projects the position of the marker, calculated by the marker position calculation unit, onto the marker plane, thereby correcting the position of the marker.

3 Claims, 7 Drawing Sheets

(56) References Cited

OTHER PUBLICATIONS

Y. Zhuang, F. Yan and H. Hu, "Automatic Extrinsic Self-Calibration for Fusing Data From Monocular Vision and 3-D Laser Scanner," in IEEE Transactions on Instrumentation and Measurement, vol. 63, No. 7, pp. 1874-1876, Jul. 2014, doi: 10.1109/TIM.2014.2307731 (Year: 2014).*

Montoya, O. et al.: "COUPLED: Calibration of a LiDAR and Camera Rig Using Automatic Plane Detection", Pattern Recognition: 2th Mexican Conference, MCPR 2020, vol. 12088, Jan. 1, 2020 (Jan. 1, 2020), pp. 209-218, XP93086126, Cham ISSN: 0302-9743, DOI: 10.1007/978-3-030-49076-8_20, ISBN: 978-3-030-49076-8, Retrieved from the Internet URL https://doi.0rg/10.1007/978-3-030-49076-8 20.

Zhuang Y. et al., "Automatic Extrinsic Self-Calibration for Fusing Data from Monocular Vision and 3-D Laser Scanner", IEEE Transactions on Instrumentation and Measurement, IEEE, USA, vol. 63, No. 7, Jul. 5, 2014, pp. 1874-1876, XP011550248.

\* cited by examiner

Fig. 4C ACTUAL POSITION

Fig. 6C ACTUAL POSITION

POSITION CALCULATED FROM IMAGE DATA

POSITION CALCULATED FROM IMAGE DATA

Fig. 7

MARKER DETECTION APPARATUS AND ROBOT TEACHING SYSTEM

BACKGROUND

Field

The present invention relates to a marker detection apparatus and a robot teaching system.

Description of Related Art

In recent years, many robots have become prevalent in industrial fields. The robots are used in, for example, assembling of electronic components and machine components, welding, transportation, or the like, making production lines of factories more efficient and automatized.

For example, a program for causing a welding robot to perform a desired operation is needed to be generated and stored in advance as so as to be used as so-called teaching data. In order to generate the teaching data, an operator cooperates with a robot control apparatus using a teaching pendant and operates an actual robot to record the operation.

When an operator generates teaching data while actually operating a robot using a teaching pendant, dependence on the skills of the operator may be large and a long time may be needed in some cases. Therefore, in order to reduce burdens on an operator, a robot system that recognizes the position of a robot using an AR device and a marker has been disclosed (for example, Patent Publication JP-A-2021-62463).

In a technology disclosed in Patent Publication JP-A-2021-62463, an AR device simultaneously detects two reference markers and recognizes a positional relationship with a robot coordinate system specification marker to recognize the position or orientation of a robot while suppressing the deviation of the display position of an AR graphic. Such a robot system is needed to appropriately detect a marker as a reference in order to accurately recognize the positions or orientations of a workpiece and a robot.

SUMMARY

However, in the technology disclosed in Patent Publication JP-A-2021-62463, the contour position of a marker is deviated in contour determination or the like in image processing or a marker image is distorted according to a viewing angle position due to the distortion of a lens or the like, when a two-dimensional camera is, for example, used to detect the marker. As a result, there is a possibility that the detected position of the marker is deviated from the actual position of the marker.

In view of this, the present invention has an object of providing a marker detection apparatus able to easily detect highly accurately the position of a marker and a robot teaching system using the same.

An aspect of the present invention provides a marker detection apparatus including: an image generation unit that superimposes point group data, acquired by a 3D camera and photographed from a viewpoint same as a viewpoint of a 2D camera, on image data acquired by the 2D camera, thereby generating a combined image; a marker position calculation unit that detects a marker and calculates a position of the marker on a basis of the image data of the combined image; a plane detection unit that detects a plane on a basis of the point group data of the combined image; a marker plane determination unit that determines a marker plane on which the marker exists on a basis of point group data included in a region of the marker detected from the position of the marker calculated by the marker position calculation unit and the plane detected by the plane detection unit; and a marker position correction unit that projects the position of the marker, calculated by the marker position calculation unit, onto the marker plane, thereby correcting the position of the marker.

According to the aspect, the marker position calculation unit detects a marker and calculates a position of the marker on a basis of image data of a combined image of the image data and point group data generated by the image generation unit, and the plane detection unit detects a plane on a basis of the point group data of the combined image. Then, the marker plane determination unit determines a marker plane on which the marker exists on a basis of point group data included in a region of the marker detected from the position of the marker calculated by the marker position calculation unit and the plane detected by the plane detection unit. The marker position correction unit projects the position of the marker calculated by the marker position calculation unit onto the marker plane to correct the position of the marker. Thus, it is possible to detect the position of a marker with high accuracy. Note that the recognition of the position of a marker simply using a distance camera or the like is also taken into consideration but the recognition of the marker on an image is not allowed or an accuracy in detecting the position becomes low even if the recognition is allowed since the resolution of the image formed by point group data is low. On the other hand, the marker detection apparatus according to the aspect of the present invention uses image data and point group data and thus is allowed to detect the position of a marker with high accuracy.

In the above aspect, the marker plane determination unit may determine the plane as the marker plane when a prescribed ratio or more of the point group data in the region of the marker, detected in the combined image, is included in the plane detected by the plane detection unit.

According to the aspect, the marker plane determination unit determines a plane on which a marker exists using point group data and thus is allowed to appropriately determine whether the marker exits on a plane detected by the plane detection unit. As a result, the marker plane determination unit determines a plane detected by the plane detection unit as a marker plane when the marker exists on the plane detected by the plane detection unit, and the marker position correction unit projects a position of the marker calculated by the marker position calculation unit onto the marker plane to correct the position of the marker. Thus, it is possible to appropriately detect the position of a marker with high accuracy.

In the above aspect, the marker plane determination unit may determine an imaginary plane constituted by the point group data in the region of the marker as the marker plane when the prescribed ratio or more of the point group data in the region of the marker, detected in the combined image, is not included in the plane detected by the plane detection unit.

According to the aspect, the marker plane determination unit determines a plane on which a marker exists using point group data and thus is allowed to appropriately determine whether the marker exits on a plane detected by the plane detection unit. As a result, the marker plane determination unit determines an imaginary plane constituted by point group data in a region of the marker as a marker plane, and the marker position correction unit projects a position of the marker calculated by the marker position calculation unit onto the marker plane to correct the position of the marker. Thus, it is possible to appropriately detect the position of a marker with high accuracy.

In the above aspect, the marker plane determination unit may determine the plane, detected by the plane detection unit, as the marker plane when the marker is installed on a workpiece, and determine an imaginary plane constituted by the point group data in the region of the marker, detected in the combined image, as the marker plane when the marker is installed on a manipulator.

According to the aspect, the marker plane determination unit determines a plane detected by the plane detection unit as a marker plane when a marker is installed on a workpiece, and determines an imaginary plane constituted by point group data in a region of a marker as a marker plane when the marker is installed on a manipulator. That is, the marker plane determination unit is allowed to appropriately determine a marker plane according to an installation position of a marker. As a result, the marker position correction unit is allowed to appropriately correct the position of a marker by projecting the position of the marker calculated by the marker position calculation unit onto a marker plane determined by the marker plane determination unit.

An aspect of the present invention provides a robot teaching system including: a photographing unit having a 2D camera that photographs an image including a workpiece and a marker and a 3D camera that photographs an image from a viewpoint same as a viewpoint of the 2D camera; an image generation unit that superimposes point group data, acquired by the 3D camera, on image data acquired by the 2D camera, thereby generating a combined image; a marker position calculation unit that detects the marker and calculates a position of the marker on a basis of the image data of the combined image; a plane detection unit that detects a plane on a basis of the point group data of the combined image; a marker plane determination unit that determines a marker plane, on which the marker exists, on a basis of point group data included in a region of the marker detected from the position of the marker calculated by the marker position calculation unit and the plane detected by the plane detection unit; a marker position correction unit that projects the position of the marker, calculated by the marker position calculation unit, onto the marker plane, thereby correcting the position of the marker; a camera coordinate system setting unit that sets a camera coordinate system on a basis of the corrected position of the marker; and a program generation unit that generates a working program for operating a manipulator while converting an operation path of the manipulator in the camera coordinate system into a robot coordinate system set in a robot control apparatus.

According to the aspect, the photographing unit has a 2D camera and a 3D camera that photographs an image from a viewpoint same as a viewpoint of the 2D camera, the marker position calculation unit detects a marker and calculates a position of the marker on a basis of image data of a combined image of the image data and point group data generated by the image generation unit, and the plane detection unit detects a plane on a basis of the point group data of the combined image. Then, the marker plane determination unit determines a marker plane on which the marker exists on a basis of point group data included in a region of the marker detected from the position of the marker calculated by the marker position calculation unit and the plane detected by the plane detection unit, and the marker position correction unit projects the position of the marker calculated by the marker position calculation unit onto the marker plane to correct the position of the marker. The camera coordinate system setting unit sets a camera coordinate system on a basis of the position of the marker corrected by the marker position correction unit, and the program generation unit generates a working program for operating a manipulator while converting an operation path of the manipulator in the camera coordinate system into a robot coordinate system set in a robot control apparatus. As a result, since a camera coordinate system is set and a working program is generated on a basis of the position of a marker detected with higher accuracy, it is possible to appropriately operate a manipulator with higher accuracy.

According to the present invention, it is possible to provide a marker detection apparatus able to detect highly accurately the position of a marker and a robot teaching system using the same.

DETAILED DESCRIPTION

Hereinafter, embodiments of the present invention will be specifically described with reference to the drawings. Note that the following embodiments only show a specific example for carrying out the present invention and do not intend to interpret the present invention in a limited way. Further, in order to facilitate the understanding of the description, the same constituting elements are denoted by the same symbols as much as possible in the respective drawings, and duplicated descriptions may be omitted in some cases.

First Embodiment

Basic Configuration of Welding Robot System

Figure 1:
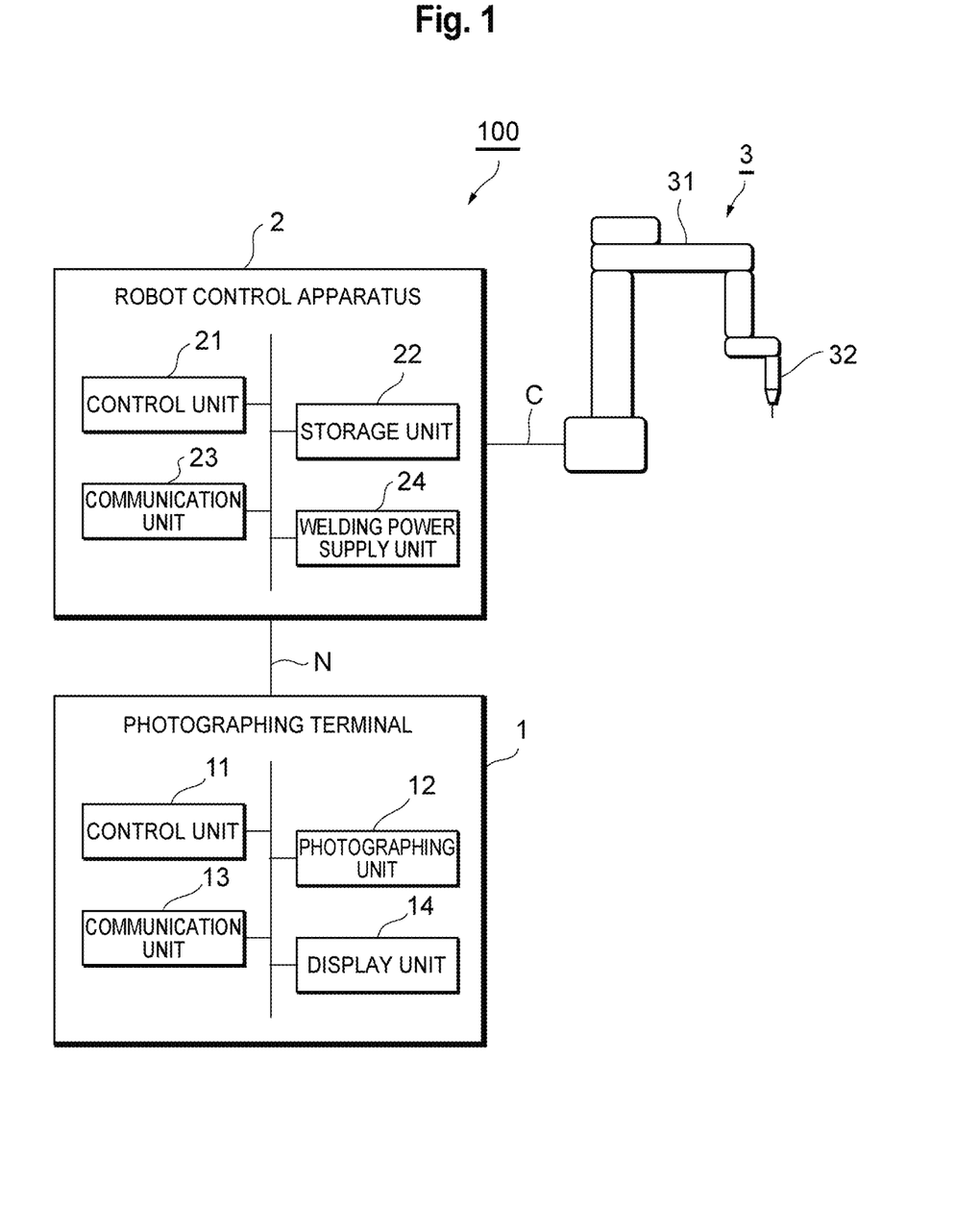
FIG. 1 is a diagram exemplifying the configuration of a welding robot system 100 including a robot teaching system according to a girst embodiment of the present invention.

FIG. 1 is a diagram exemplifying the configuration of a welding robot system 100 including a robot teaching system according to a first embodiment of the present invention. As shown in FIG. 1, the welding robot system 100 includes, for example, a photographing terminal 1, a robot control apparatus 2, and a manipulator 3. The photographing terminal 1 and the robot control apparatus 2 are connected to each other via, for example, a network N, and the robot control apparatus 2 and the manipulator 3 are connected to each other via, for example, a communication cable C. The network N may be a wired network (including a communication cable) or a wireless network. Note that the welding robot system 100 may include a teaching pendant. The teaching pendant is an operating apparatus with which an operator teaches the operation of the manipulator 3.

The manipulator 3 is a welding robot (industrial robot) that performs arc welding according to construction conditions set in the robot control apparatus 2. The manipulator 3 has, for example, an articulated arm 31 provided on a base member fixed to a floor or the like of a factory and a welding torch 32 (end effector) connected to the tip end of the articulated arm 31.

The robot control apparatus 2 is a control unit that controls the operation of the manipulator 3 and includes, for example, a control unit 21, a storage unit 22, a communication unit 23, and a welding power supply unit 24.

The control unit 21 runs, for example, a working program stored in the storage unit 22 with a processor to control the manipulator 3 and the welding power supply unit 24.

The communication unit 23 controls communication with the photographing terminal 1 connected via the network N or communication with the manipulator 3 connected via the communication cable C.

The welding power supply unit 24 supplies, in order to, for example, generate an arc between the tip end of a welding wire and a workpiece, a welding current, a welding voltage, or the like to the manipulator 3 according to previously-set welding construction conditions. The welding construction conditions include, for example, data items such as a welding condition, a welding start position, a welding end position, an arc discharge time, a welding distance, and the attitude and movement speed of a welding torch. The welding power supply unit 24 may be provided separately from the robot control apparatus 2.

The photographing terminal 1 is, for example, a digital camera (2D camera) but may be a portable terminal with a digital camera. The portable terminal includes, for example, transportable terminal such as a tablet terminal, a smart phone, a mobile information terminal (PDA), and a notebook PC (personal computer). The photographing terminal 1 includes, for example, a control unit 11, a photographing unit 12, a communication unit 13, and a display unit 14.

The control unit 11 runs a prescribed program stored in a memory with a processor to control the respective units of the photographing terminal 1.

The photographing unit 12 includes, for example, a lens and an imaging element (image sensor) and converts the light of a subject received by the lens into an electric signal (digital image data).

The communication unit 13 controls communication with the robot control apparatus 2 connected via the network N.

The display unit 14 is, for example, a display having a touch panel, displays an image of a subject photographed by the photographing unit 12, and receives an input such as operating instructions by an operator. The display unit 14 may be provided separately from the photographing terminal 1 as, for example, a display apparatus having a touch panel.

Moreover, the photographing terminal 1 also has a function as a 3D camera and may include, for example, a distance measurement sensor such as a LiDAR (Light Detection and Ranging) sensor, a millimeter wave sensor, and an ultrasonic sensor. Typically, the distance measurement sensor is one that irradiates a measurement target with laser light to grasp the shape of the measurement target on the basis of reflected light, and acquires data obtained by performing a so-called 3D scan as point group data. Note that the point group data may include, for example, position (distance) information shown by three-dimensional coordinate values (X, Y, Z) and color information shown by (R, G, B).

Note that the 2D camera that acquires image data and the 3D camera that acquires point group data described above may be configured as one photographing terminal so as to include both functions, or may be configured as separate photographing terminals that include the respective functions.

Configuration of Robot Teaching System

Figure 2:
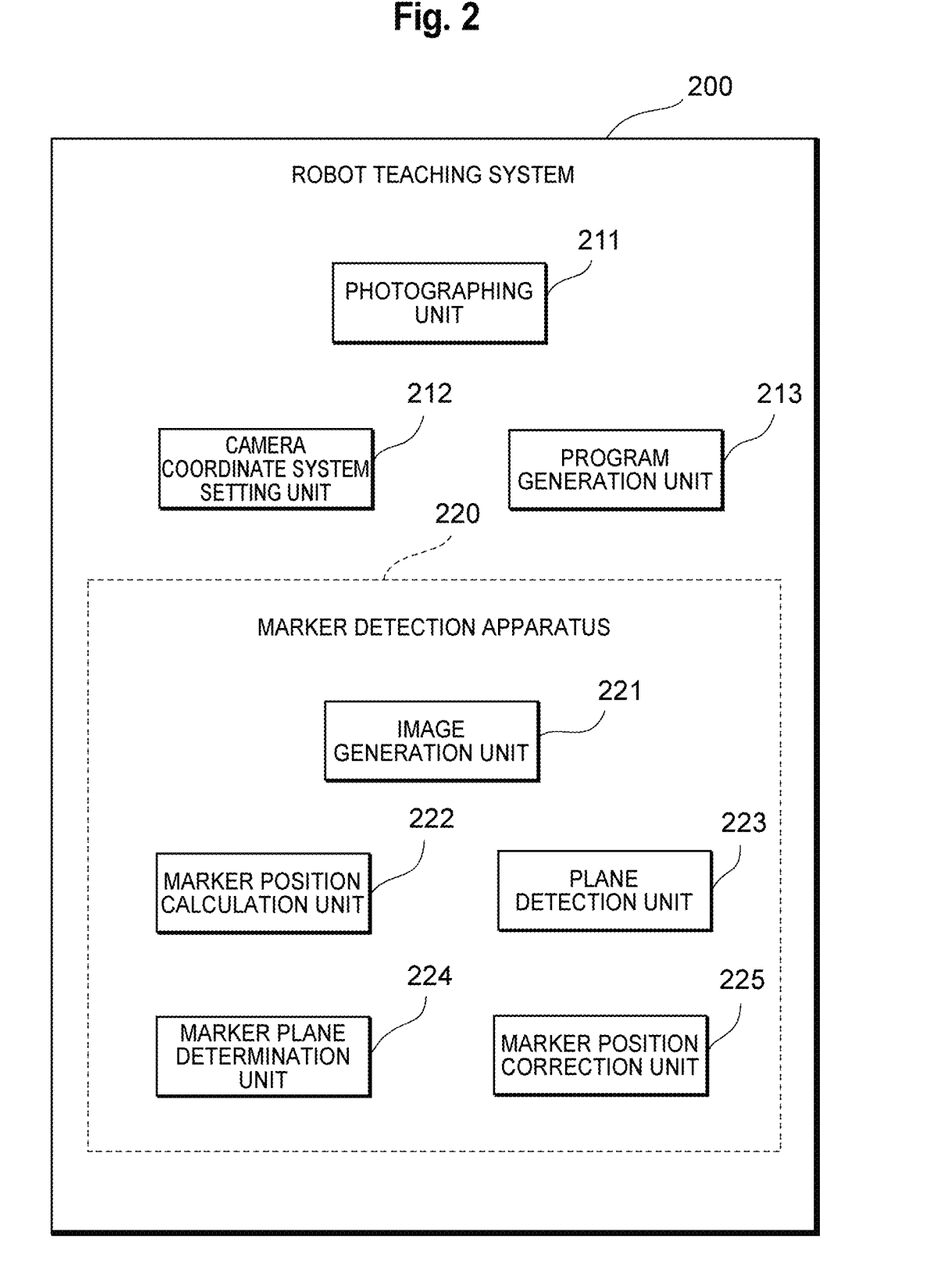
FIG. 2 is a diagram exemplifying the functional configuration of a robot teaching system 200 according to the first embodiment of the present invention.

FIG. 2 is a diagram exemplifying the functional configuration of a robot teaching system 200 according to a second embodiment of the present invention. As shown in FIG. 2, the robot teaching system 200 has, for example, a photographing unit 211, a camera coordinate system setting unit 212, a program generation unit 213, and a marker detection apparatus 220 that detects a marker serving as a reference for setting a camera coordinate system as the functional configuration. Note that the marker detection apparatus 220 includes an image generation unit 221, a marker position calculation unit 222, a plane detection unit 223, a marker plane determination unit 224, and a marker position correction unit 225.

Among these functions, the photographing unit 211 is a function provided in the photographing terminal 1. On the other hand, all the respective units of the camera coordinate system setting unit 212, the program generation unit 213, and the marker detection apparatus 220 may be provided in any of the photographing terminal 1 and the robot control apparatus 2, or the respective functions may be dispersively provided in the photographing terminal 1 and the robot control apparatus 2. Further, apparatuses other than the photographing terminal 1 and the robot control apparatus 2 may include a part or all of the above functions.

The photographing unit 211 is the same as the photographing unit 12 of the photographing terminal 1 and acquires image data as a function of a 2D camera. Moreover, the photographing unit 211 acquires point group data as a function of a 3D camera. Note that the photographing unit 211 acquires an image including at least a marker and a workpiece serving as a welding target.

The camera coordinate system setting unit 212 sets a camera coordinate system on the basis of a marker included in an image photographed by the photographing unit 211. For example, the camera coordinate system setting unit 212 sets, with the position of a marker as an origin in an image photographed by the photographing unit 211, a three-dimensional orthogonal coordinate system based on X, Y, and Z axes orthogonal to each other at the origin as a camera coordinate system.

Figure 3:
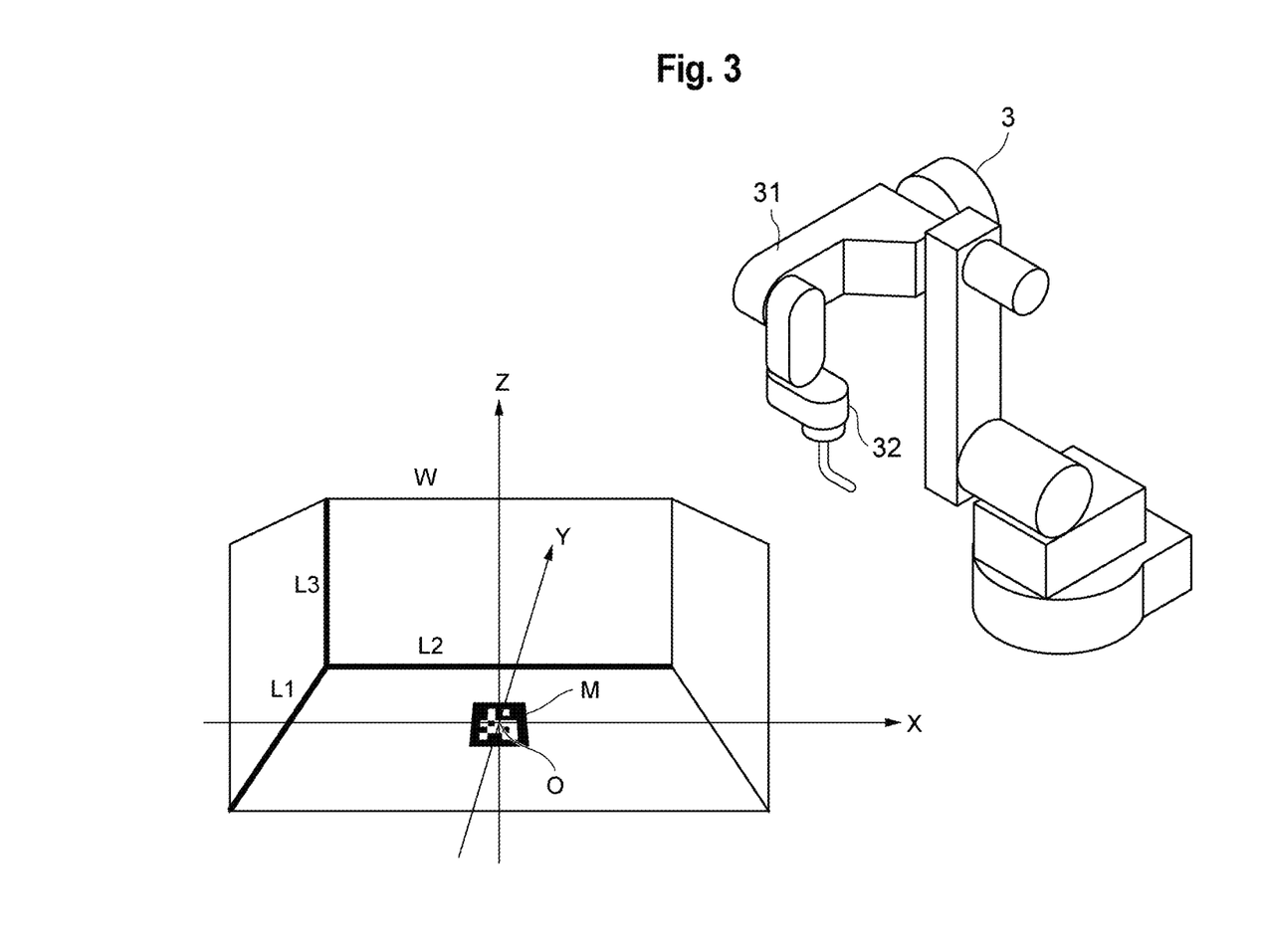
FIG. 3 is a diagram showing a state in which a marker M is set in a workpiece W to be welded and a camera coordinate system is set with the position of the marker M as an origin O.

FIG. 3 is a diagram showing a state in which a marker M is set in a workpiece W to be welded and a camera coordinate system is set with the position of the marker M as an origin O. As shown in FIG. 3, the marker M is set in the bottom plate of the workpiece W, and the camera coordinate system setting unit 212 sets, using the position of the marker M included in an image photographed by the photographing unit 211 as the origin O, a three-dimensional orthogonal coordinate system with X, Y, and Z axes orthogonal to each other at the origin O as the camera coordinate system. Note that an arbitrary point in the marker M is set as the origin O. For example, a previously-set point, a central point, a selected point, or the like in the marker M is only required to be set as the origin O.

Here, when a marker M is detected from an image photographed by the photographing unit 211, the position of the marker M is appropriately detected by the marker detection apparatus 220 on the basis of image data acquired by a 2D camera and point group data acquired by a 3D camera.

The marker M is only required to be an identifier that allows the photographing unit 211 to recognize that the marker M is placed inside a space. As a marker, an AR marker is, for example, preferably used. By the use of the AR marker, it is possible to easily display a user coordinate system with the AR marker as an origin so as to overlap an actual image when the AR marker placed inside a space is recognized. Note that the details of the processing of the marker detection apparatus 220 that detects a marker M will be described later.

In a camera coordinate system set by the camera coordinate system setting unit 212, the operation path of the manipulator 3 is set on the basis of welding positions L1, L2, and L3 of the workpiece W included in an image photographed by the photographing unit 211. For example, in an image photographed by the photographing unit 211, the operation path of the manipulator 3 (welding torch 32) is manually selected by a user or distances between the welding positions L1, L2, and L3 and the welding torch 32 are calculated and automatically set so that the welding torch 32 attached to the tip end of the manipulator 3 operates along the welding positions L1, L2, and L3 of the workpiece W.

On the other hand, the robot control apparatus 2 grasps the position and attitude of the manipulator 3 from information on the angles of the respective axes of the manipulator 3 that are controlled by the robot control apparatus 2, or the like (robot coordinate system). Then, on the basis of the installed position of the marker M and the position and attitude (installed position) of the manipulator 3 with respect to the installed position of the marker M, the robot control apparatus 2 is able to perform calibration to match a camera coordinate system and the robot coordinate system to each other. The calibration may be performed by, for example, aligning the tip end of the manipulator 3 (welding torch 32) with the installed position of the marker M.

The program generation unit 213 generates a working program for operating the manipulator 3, while converting the operation path of the manipulator 3 set in the camera coordinate system from a camera coordinate system into a robot coordinate system set in the robot control apparatus 2.

As described above, in the robot teaching system 200, a marker M is detected from an image photographed by the photographing unit 211 to set a camera coordinate system, and a working program for appropriately performing welding at welding positions L1, L2, and L3 by the manipulator 3 is generated, while the welding positions L1, L2, and L3 in the camera coordinate system and the operation path of the manipulator 3 are converted into a robot coordinate system. Then, the working program is stored in the storage unit of the robot control apparatus 2. The robot control apparatus 2 controls the operation of the manipulator 3 on the basis of the working program and is thus able to appropriately perform welding at the welding positions L1, L2, and L3 of the workpiece W as the welding robot system.

Details of Processing in Marker Detection Apparatus 220

As described above, a camera coordinate system is set with the position of a marker M as an origin O. Therefore, it is important to appropriately detect the position of the marker M. Hereinafter, the processing of the marker detection apparatus 220 that detects the position of a marker M will be described in detail.

FIGS. 4A to 4F are diagrams schematically showing the state of specific processing by the marker detection apparatus 220 that detects the position of a marker M installed on a workpiece W. As shown in FIGS. 4A to 4F, the marker detection apparatus 220 detects the position of the marker M on the basis of image data acquired by a 2D camera and point group data acquired by a 3D camera.

Figure 4A:
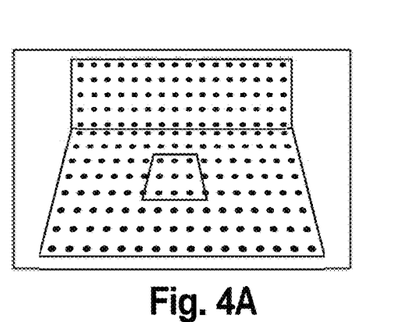
FIGS. 4A to 4F are diagrams schematically showing the state of specific processing in a marker detection apparatus 220 that detects the position of the marker M set in the workpiece W.

The image generation unit 221 superimposes the point group data acquired by the 3D camera on the image data acquired by the 2D camera to generate a combined image (FIG. 4A). For example, an image is photographed by a digital camera so as to include the workpiece W serving as a welding target and the marker M, and the photographed image is stored as image data acquired by the 2D camera. Position (distance) information corresponding to the workpiece W serving as a welding target and the marker M is measured by a distance measurement sensor and acquired as point group data shown by three-dimensional coordinate values (X, Y, Z). Then, the image generation unit 221 superimposes the point group data on the image data acquired by the 2D camera to generate a combined image. Specifically, pixel (XY coordinate values) information matching in the image data acquired by the 2D camera is only required to be added to three-dimensional coordinate values (X, Y, Z) and RGB values corresponding to the respective points of the point group data acquired by the 3D camera. As described above, a prescribed drawing range based on the image data acquired by the 2D camera and the positions of respective plots constituting the point group data acquired by the 3D camera are recorded so as to correspond to each other.

Note that the image generation unit 221 may grasp a relative position attitude between the 2D camera and the 3D camera to superimpose the point group data acquired by the 3D camera on the image data acquired by the 2D camera. The image data acquired by the 2D camera and the point group data acquired by the 3D camera are typically photographed from the same viewpoint.

Figure 4B:
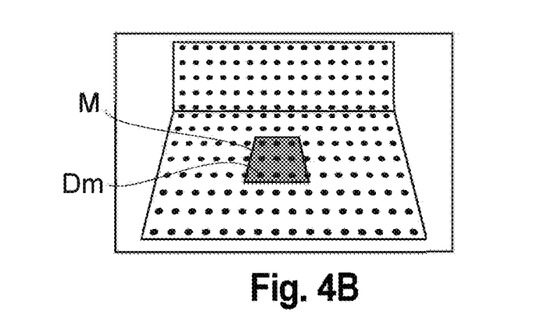

The marker position calculation unit 222 detects the marker M and calculates the position of the marker M on the basis of the image data of the combined image generated by the image generation unit 221 (FIG. 4B). For example, the marker position calculation unit 222 may detect, from the image data of the combined image generated by the image generation unit 221, the previously-set image pattern of the marker M using prescribed image processing or the like. Then, the marker position calculation unit 222 converts coordinates in the image data into coordinates in a space to calculate a three-dimensional position for the marker M detected from the image data. Here, the position of the marker M may represent the position of the contour range of the marker M or the positions of the points of the four corners of the marker M.

The marker position calculation unit 222 may calculate the three-dimensional position of the marker M detected from the image data on the basis of previously-set camera parameters including, for example, the position, visual line direction, lens distortion, zoom, resolution, other setting values of a camera, or the like. Further, the marker position calculation unit 222 grasps point group data Dm included in the region of the marker M from the calculated three-dimensional position of the marker M.

Figure 4C:
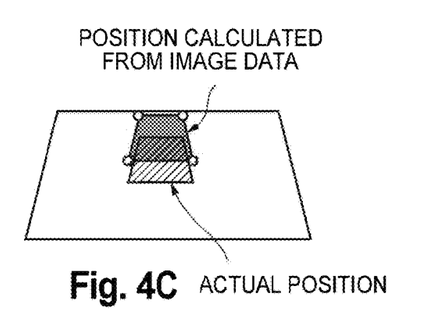

Here, since the three-dimensional position of the marker M calculated by the marker position calculation unit 222 is calculated on the basis of the image data acquired by the 2D camera, there is a case that the position calculated from the image data is deviated from the actual position of the marker M (FIG. 4C).

Figure 4D:
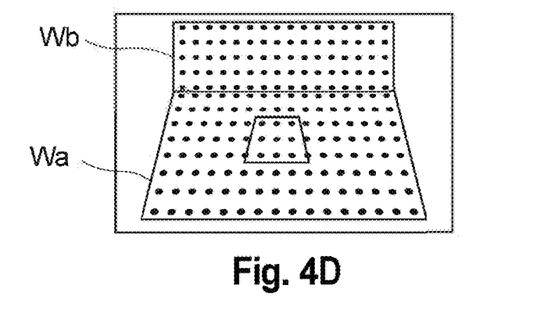

The plane detection unit 223 detects a plane on the basis of the point group data of the combined image generated by the image generation unit 221 (FIG. 4D). For example, the plane detection unit 223 detects a plane Wa serving as the bottom plate and a plane Wb serving as the rear plate of the workpiece W as planes having a prescribed area or more here.

Figure 4E:
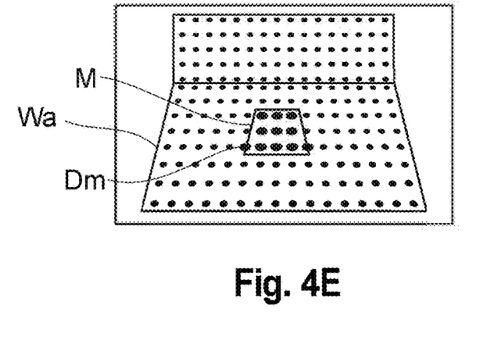

The marker plane determination unit 224 determines a marker plane on which the marker M exists on the basis of the point group data Dm included in the region of the marker M detected in the combined image and the planes Wa and Wb detected by the plane detection unit 223 (FIG. 4E). For example, the marker plane determination unit 224 determines whether the point group data Dm included in the region of the marker M is included in point group data constituting the plane Wa (Wb) here. Specifically, when a prescribed ratio (for example, 20% to 80%) or more of the point group data Dm included in the region of the marker M is included in the point group data constituting the plane Wa, the marker plane determination unit 224 may determine the plane Wa as a marker plane due to the fact that the marker M exists on the plane Wa.

On the other hand, the point group data Dm included in the region of the marker M is not included in point group data constituting the plane Wb as shown in FIGS. 4A to 4F. Therefore, the marker plane determination unit 224 does not determine the plane Wb as a marker plane.

Figure 4F:
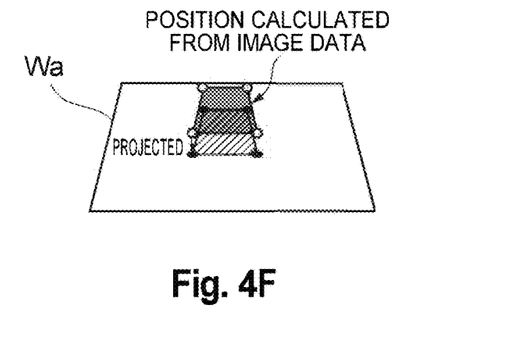

The marker position correction unit 225 projects the position of the marker M calculated by the marker position calculation unit 222 onto the marker plane determined by the marker plane determination unit 224 to correct the position of the marker M (FIG. 4F). For example, the marker position correction unit 225 projects the position of the marker M calculated by the marker position calculation unit 222 in a perpendicular direction with respect to the plane Wa determined as a marker plane by the marker plane determination unit 224. That is, the marker position correction unit 225 moves the position of the contour range of the marker M detected from the position of the marker M calculated by the marker position calculation unit 222 in a perpendicular direction with the plane Wa as a reference, and determines that the marker M is installed at a position crossing the plane Wa. Then, the marker position correction unit 225 assumes the position of the marker M projected onto the plane Wa as a position at which the marker M is installed.

In this manner, the marker detection apparatus 220 projects the position of the marker M calculated on the basis of the image data acquired by the 2D camera onto the marker plane (the plane Wa here) on which the marker M exists on the basis of the point group data acquired by the 3D camera to correct the position of the marker M. Therefore, the marker detection apparatus 220 detects the position of the marker M with high accuracy.

As described above, in the marker detection apparatus 220 according to the first embodiment of the present invention, the marker position calculation unit 222 detects a marker M and calculates the position of the marker M on the basis of image data of a combined image of the image data and point group data generated by the image generation unit 221. The plane detection unit 223 detects planes Wa and Wb on the basis of the point group data of the combined image. Then, the marker plane determination unit 224 determines a marker plane (the plane Wa in the present embodiment) on which the marker M exists on the basis of point group data Dm included in the region of the marker M detected by the marker position calculation unit 222 and planes Wa and Wb detected by the plane detection unit 223, and the marker position correction unit 225 projects the position of the marker M calculated by the marker position calculation unit 222 onto the marker plane to correct the position of the marker M. Thus, it is possible to detect the position of a marker M with high accuracy.

Moreover, in the robot teaching system 200 using the marker detection apparatus 220 according to the first embodiment of the present invention, the camera coordinate system setting unit 212 sets, on the basis of the position of a marker M detected highly accurately by the marker detection apparatus 220, a camera coordinate system with the position of the marker M as an origin O. The program generation unit 213 generates a working program for operating the manipulator 3, while converting the operation path of the manipulator 3 set in the camera coordinate system from the camera coordinate system into a robot coordinate system set in the robot control apparatus 2 on the basis of the set position of the marker M. Thus, it is possible to more highly accurately perform welding at an appropriate welding position.

Note that in the present embodiment, the marker plane determination unit 224 determines the plane Wa as a marker plane due to the fact that the marker M exists on the plane Wa on the basis of the point group data Dm included in the region of the marker M and the point group data constituting the plane Wa. However, a method for determining the plane Wa as a marker plane is not limited to this. For example, when a user selects a plane on which a marker M exists, the marker plane determination unit 224 may determine the selected plane as a marker plane. When a marker M is installed on a workpiece W, the marker plane determination unit 224 may determine any of planes detected by the plane detection unit 223 as a marker plane or may determine a selected plane as a marker plane with the selection of any of the planes by the user.

Further, in the present embodiment, the marker position correction unit 225 projects the position of the marker M calculated by the marker position calculation unit 222 onto the marker plane determined by the marker plane determination unit 224 to correct the position of the marker M. However, when the position of the marker M is greatly changed before and after the correction, there is a possibility that the marker M does not actually exist on the marker plane determined by the marker plane determination unit 224. Therefore, when a difference in the position of the marker M before and after the correction exceeds a prescribed threshold, the position of the marker M calculated by the marker position calculation unit 222 may be assumed as the position of the marker M without the projection of the position of the marker M calculated by the marker position calculation unit 222 onto the marker plane (the plane Wa in the present embodiment) determined by the marker plane determination unit 224.

Second Embodiment

Next, a second embodiment of the present invention will describe a state in which the position of a marker M is appropriately detected when the marker M is installed on a manipulator 3. Note that the configurations of a robot teaching system and a marker detection apparatus are the same as those of the robot teaching system 200 and the marker detection apparatus 220 described using FIGS. 1 and 2. Therefore, the detailed descriptions of the same processing and functions will be omitted in some cases. In the present embodiment, a point different from that of the first embodiment will be described in detail.

Figure 5:
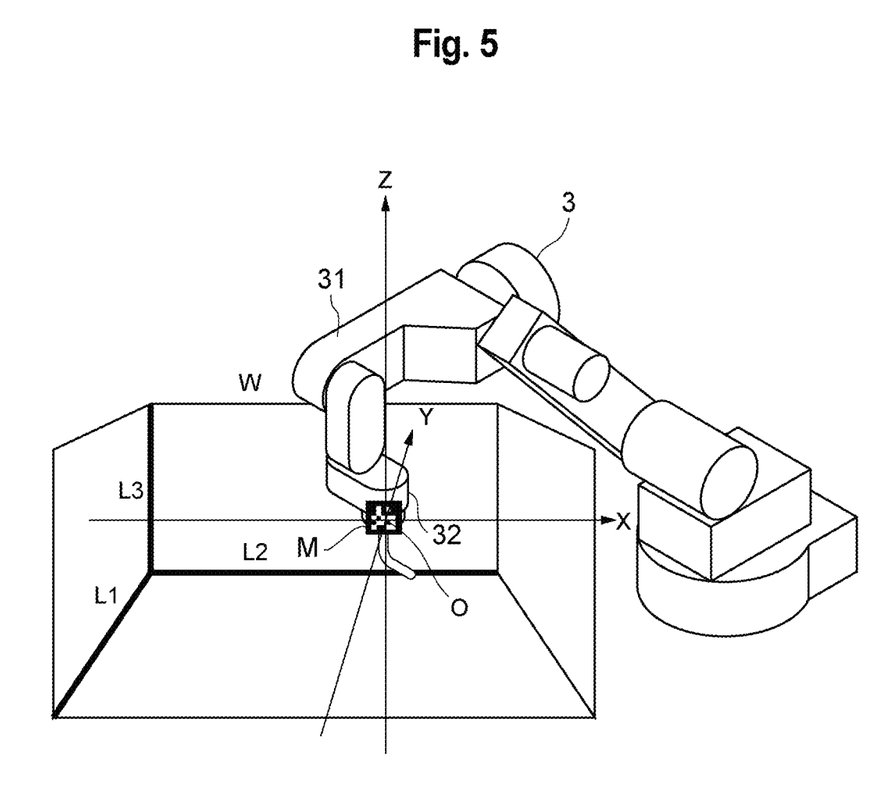
FIG. 5 is a diagram showing a state in which a marker M is set on a manipulator 3 and a camera coordinate system is set with the position of the marker M as an origin O.

FIG. 5 is a diagram showing a state in which a marker M is set on the manipulator 3 and a camera coordinate system is set with the position of the marker M as an origin O. As shown in FIG. 5, the marker M is installed on the manipulator 3, and a camera coordinate system setting unit 212 sets, with the position of the marker M included in an image photographed by a photographing unit 211 as the origin O, a three-dimensional orthogonal coordinate system based on X, Y, and Z axes orthogonal to each other at the origin O as a camera coordinate system. Then, when the marker M is detected from the image photographed by the photographing unit 211, the position of the marker M is appropriately detected by a marker detection apparatus 220 on the basis of image data acquired by a 2D camera and point group data acquired by a 3D camera.

Details of Processing by Marker Detection Apparatus 220

Hereinafter, the processing of the marker detection apparatus 220 that detects the position of a marker M in the present embodiment will be described in detail.

FIGS. 6A to 6F are diagrams schematically showing the state of specific processing by the marker detection apparatus 220 that detects the position of a marker M installed on the manipulator 3. As shown in FIGS. 6A to 6F, the marker detection apparatus 220 detects the position of the marker M on the basis of image data acquired by a 2D camera and point group data acquired by a 3D camera.

Figure 6A:
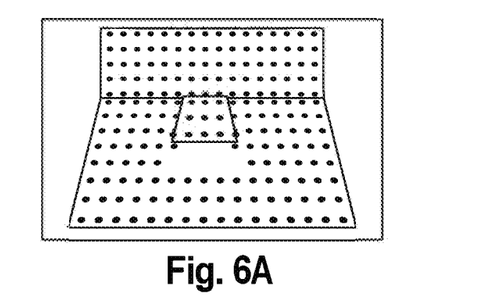
FIGS. 6A to 6F are diagrams schematically showing the state of specific processing in the marker detection apparatus 220 that detects the position of a marker M installed on the manipulator 3.
Figure 6B:
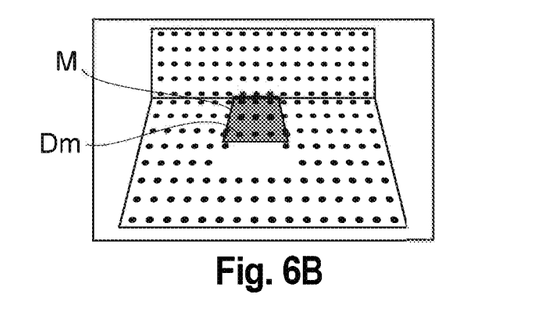

An image generation unit 221 superimposes the point group data acquired by the 3D camera on the image data acquired by the 2D camera to generate a combined image (FIG. 6A). A marker position calculation unit 222 detects the marker M and calculates the position of the marker M on the basis of the image data of the combined image generated by the image generation unit 221 (FIG. 6B). Further, the marker position calculation unit 222 grasps point group data Dm included in the region of the marker M from the calculated three-dimensional position of the marker M. The processing is the same as that described using FIGS. 4A and 4B of the first embodiment.

Figure 6C:
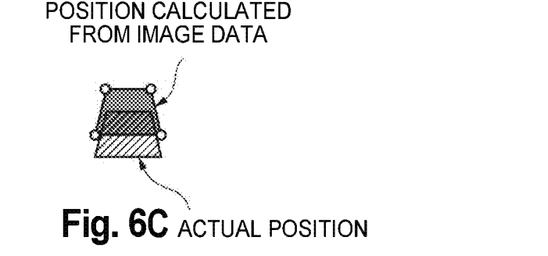

Further, with regard to the marker position calculation unit 222, similarly to the first embodiment shown in FIG. 4C, the three-dimensional position of the marker M calculated by the marker position calculation unit 222 is calculated on the basis of the image data acquired by the 2D camera. Therefore, there is a case that the position calculated from the image data is deviated from the actual position of the marker M (FIG. 6C).

Figure 6D:
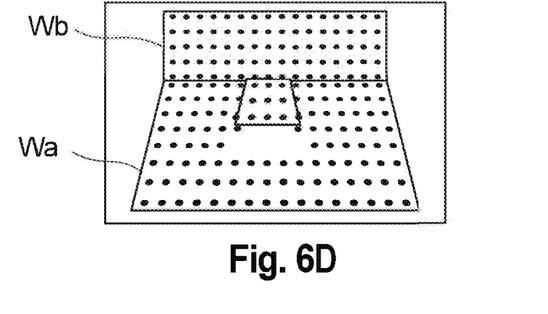

A plane detection unit 223 detects a plane on the basis of the point group data of the combined image generated by the image generation unit 221 (FIG. 6D). For example, the plane detection unit 223 detects a plane Wa serving as the bottom plate and a plane Wb serving as the rear plate of a workpiece W as planes having a prescribed area or more here.

Figure 6E:
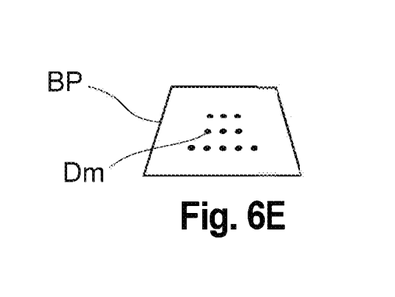

A marker plane determination unit 224 determines a marker plane on which the marker M exists on the basis of the point group data Dm included in the region of the marker M detected in the combined image and the planes Wa and Wb detected by the plane detection unit 223 (FIG. 6E). In the present embodiment, the marker M is not installed on any of the planes Wa and Wb constituting the workpiece W but is installed on the manipulator 3 as shown in FIG. 5. Therefore, the marker plane determination unit 224 determines that a prescribed ratio (for example, 20% to 80%) or more of the point group data Dm included in the region of the marker M is not included in point group data constituting the planes Wa and Wb and the marker M does not exist on the plane Wa and Wb. In this case, the marker plane determination unit 224 generates an imaginary plane BP constituted by the point group data Dm on the basis of the point group data Dm included in the region of the marker M and determines the imaginary plane BP as a marker plane on which the marker M exists (FIG. 6E).

Figure 6F:
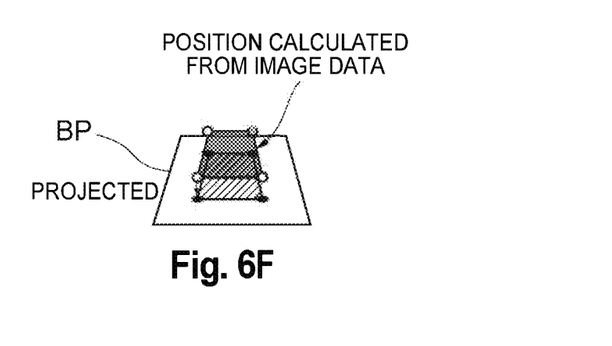

A marker position correction unit 225 projects the position of the marker M calculated by the marker position calculation unit 222 onto the marker plane determined by the marker plane determination unit 224 to correct the position of the marker M (FIG. 6F). For example, the marker position correction unit 225 projects the position of the marker M calculated by the marker position calculation unit 222 in a perpendicular direction with respect to the imaginary plane BP determined as a marker plane by the marker plane determination unit 224. Then, the marker position correction unit 225 assumes the position of the marker M projected onto the imaginary plane BP as a position at which the marker M is installed.

In this manner, the marker detection apparatus 220 generates the imaginary plane BP on which the marker M imaginarily exists on the basis of the point group data acquired by the 3D camera, and projects, with the imaginary plane BP as a marker plane, the position of the marker M calculated on the basis of image data acquired by the 2D camera onto the marker plane (the imaginary plane BP here) to correct the position of the marker M. Therefore, the marker detection apparatus 220 detects the position of the marker M with high accuracy.

As described above, in the marker detection apparatus 220 according to the second embodiment of the present invention, the marker plane determination unit 224 determines an imaginary plane BP as a marker plane on which a marker M exists on the basis of point group data Dm included in the region of the marker M even when the marker M is not actually provided on a plane constituting a workpiece W. Then, the marker position correction unit 225 projects the position of the marker M calculated by the marker position calculation unit 222 onto the marker plane to correct the position of the marker M. Thus, it is possible to detect the position of a marker M with high accuracy.

Note that in the present embodiment, the marker plane determination unit 224 determines that the marker M does not exist on the planes Wa and Wb on the basis of the point group data Dm included in the region of the marker M and the point group data constituting the planes Wa and Wb. However, the marker plane determination unit 224 may determine that the marker M does not exist on a plane, for example, when the marker M is installed on the manipulator 3 or when a user selects the marker M.

Further, in the present embodiment, the marker plane determination unit 224 generates the imaginary plane BP and determines the imaginary plane BP as a marker plane. However, when the point group data Dm included in the region of the marker M for generating the imaginary plane BP is extremely small or when a fluctuation in the point group data Dm is large, there is a possibility that the imaginary plane may not be appropriately generated. Therefore, when a difference in the position of the marker M before and after the correction exceeds a prescribed threshold, the position of the marker M calculated by the marker position calculation unit 222 may be assumed as the position of the marker M without the projection of the position of the marker M calculated by the marker position calculation unit 222 onto the marker plane (the imaginary plane BP in the present embodiment) determined by the marker plane determination unit 224.

Marker Detection Method

Next, a method in which the marker detection apparatus 220 according to the first and second embodiments of the present invention detects a marker will be described in detail.

Figure 7:
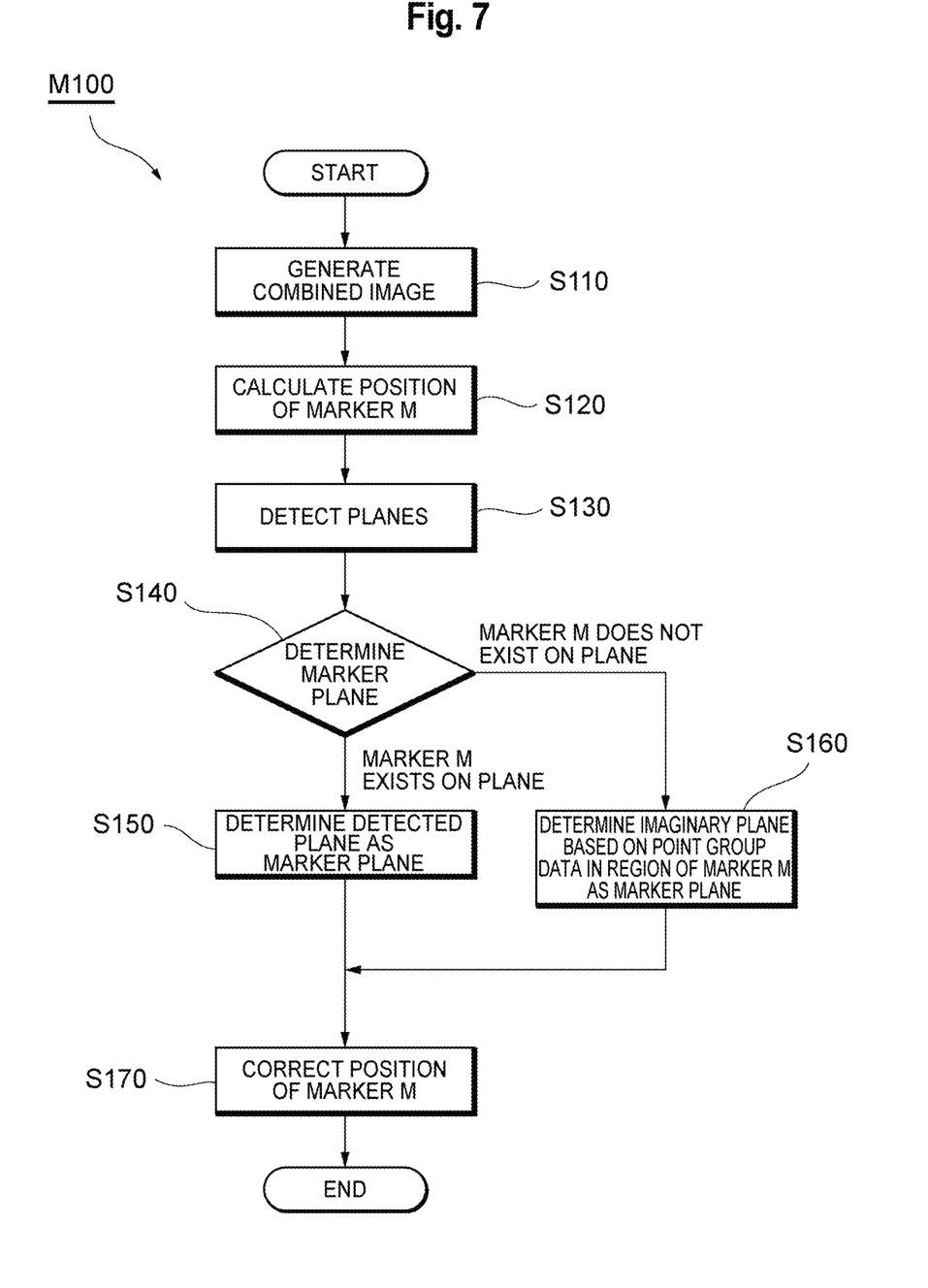
FIG. 7 is a flowchart showing the flow of the processing of a marker detection method M100 performed by the marker detection apparatus 220 according to the first and second embodiments of the present invention.

FIG. 7 is a flowchart showing the flow of the processing of a marker detection method M100 performed by the marker detection apparatus 220 according to the first and second embodiments of the present invention. As shown in FIG. 7, the marker detection method M100 includes steps S110 to S170, and the respective steps are performed by a processor included in the marker detection apparatus 220.

In step S110, the marker detection apparatus 220 superimposes point group data acquired by a 3D camera on image data acquired by a 2D camera to generate a combined image (combined image generation step). As a specific example, the image generation unit 221 in the marker detection apparatus 220 generates a combined image on the basis of image data photographed by a digital camera so as to simultaneously include a workpiece W and a marker M and point group data measured by a distance measurement sensor.

In step S120, the marker detection apparatus 220 detects the marker and the position of the marker on the basis of the image data of the combined image generated in step S110 (the marker position calculation unit). As a specific example, the marker position calculation unit 222 in the marker detection apparatus 220 detects the previously-set image pattern of the marker M from the image data and calculates the three-dimensional position of the marker M on the basis of camera parameters or the like.

In step S130, the marker detection apparatus 220 detects a plane on the basis of the point group data of the combined image generated in step S110 (plane detection step). As a specific example, the plane detection unit 223 in the marker detection apparatus 220 detects planes Wa and Wb or the like constituting the workpiece W as planes having a prescribed area or more.

In step S140, the marker detection apparatus 220 determines a marker plane on which the marker exists on the basis of point group data included in the region of the marker detected in step S120 and the plane detected in step S130 (marker plane determination step). As a specific example, the marker plane determination unit 224 in the marker detection apparatus 220 determines whether a prescribed ratio or more of point group data Dm included in the region of the marker M is included in point group data constituting the plane Wa (Wb) detected in step S130.

The marker plane determination unit 224 determines the plane Wa detected in step S130 as a marker plane when the prescribed ratio or more of the point group data Dm is included in the point group data constituting the plane Wa (Wb) (when the marker M exists on the plane Wa) (step S150).

On the other hand, the marker plane determination unit 224 determines an imaginary plane BP constituted by the point group data Dm as a marker plane when the prescribed ratio or more of the point group data Dm is not included in the point group data constituting the plane Wa (Wb) (when the marker M does not exist on the plane Wa (Wb)) (step S160).

In step S170, the marker detection apparatus 220 projects the position of the marker calculated in step S120 onto the marker plane determined in step S150 or step S160 to correct the position of the marker (marker position correction step). As a specific example, the marker position correction unit 225 in the marker detection apparatus 220 projects the position of the marker M calculated in step S120 onto the plane Wa or the imaginary plane BP to correct the position of the marker M.

As described above, according to the marker detection method M100, the marker detection apparatus 220 grasps the state of a marker M in step S140 to determine a plane Wa as a marker plane in step S150 or determine an imaginary plane BP as a marker plane in step S160 even when the marker M exists on a plane such as the plane Wa or when the marker M is installed on the manipulator 3 or the like and does not exist on a plane. Then, the marker detection apparatus 220 projects the position of the marker M onto the marker plane (the plane Wa or the imaginary plane BP) to correct the position of the marker M in step S170. Thus, it is possible to detect the position of a marker M with high accuracy even when the marker M exists on a plane such as a plane Wa or when the marker M is installed on the manipulator 3 or the like and does not exist on a plane.

Further, the above respective embodiments describe the marker detection apparatus 220 used in the robot teaching system 200 of the welding robot system 100 as an example. However, an industrial robot in which the marker detection apparatus 220 is used is not limited to the welding robot system 100. For example, the marker detection apparatus 220 is also applicable to robot systems, transportation robot systems, or the like that perform assembling, transportation, or the like of electronic components and machine components.

The embodiments described above aim to facilitate the understanding of the present invention and do not intend to interpret the present invention in a limited way. The respective constituting elements and their arrangements, materials, conditions, shapes, sizes, or the like are not limited to the exemplified ones and are adequately modifiable. Further, it is possible to partially replace or combine configurations shown in the different embodiments together.

What is claimed is:

1. A marker detection apparatus comprising:
   an image generation unit that superimposes point group data, acquired by a 3D camera and photographed from a viewpoint substantially the same as a viewpoint of a 2D camera, on image data acquired by the 2D camera, thereby generating a combined image;
   a marker position calculation unit that detects a marker and calculates a position of the marker on a basis of the image data of the combined image;
   a plane detection unit that detects a plane on a basis of the point group data of the combined image;
   a marker plane determination unit that determines a marker plane on which the marker exists on a basis of point group data included in a region of the marker detected from the position of the marker calculated by the marker position calculation unit and the plane detected by the plane detection unit, wherein the marker plane determination unit determines an imaginary plane constituted by the point group data in the region of the marker as the marker plane when the prescribed ratio or more of the point group data in the region of the marker, detected in the combined image, is not included in the plane detected by the plane detection unit; and a marker position correction unit that projects the position of the marker, calculated by the marker position calculation unit, onto the marker plane, thereby correcting the position of the marker.

2. The marker detection apparatus according to claim 1, wherein
the marker plane determination unit determines the plane as the marker plane when a prescribed ratio or more of the point group data in the region of the marker, detected in the combined image, is included in the plane detected by the plane detection unit.

3. A marker detection apparatus comprising:
an image generation unit that superimposes point group data, acquired by a 3D camera and photographed from a viewpoint substantially the same as a viewpoint of a 2D camera, on image data acquired by the 2D camera, thereby generating a combined image;
a marker position calculation unit that detects a marker and calculates a position of the marker on a basis of the image data of the combined image;
a plane detection unit that detects a plane on a basis of the point group data of the combined image;
a marker plane determination unit that determines a marker plane on which the marker exists on a basis of point group data included in a region of the marker detected from the position of the marker calculated by the marker position calculation unit and the plane detected by the plane detection unit, wherein the marker plane determination unit determines the plane, detected by the plane detection unit, as the marker plane when the marker is installed on a workpiece, and wherein the marker plane determination unit determines an imaginary plane constituted by the point group data in the region of the marker, detected in the combined image, as the marker plane when the marker is installed on a manipulator; and
a marker position correction unit that projects the position of the marker, calculated by the marker position calculation unit, onto the marker plane, thereby correcting the position of the marker.

* * * * *